United States Patent [19]

Schwendtner

[11] 3,731,190

[45] May 1, 1973

[54] SWITCHING CIRCUIT FOR MEASURING THE ELECTRICAL POWER IN TWO ENERGY FLOW DIRECTIONS (DELIVERED AND RETURNED)

[75] Inventor: Manfred Schwendtner, Schwarzenbruck, Germany

[73] Assignee: Siemens Aktiengesellschaft, Munich, Germany

[22] Filed: June 12, 1972

[21] Appl. No.: 261,657

[30] Foreign Application Priority Data

June 11, 1971 Germany..................P 21 28 883.5

[52] U.S. Cl..................................................324/142
[51] Int. Cl. ............................................G01r 21/00
[58] Field of Search......................................324/142

[56] References Cited

UNITED STATES PATENTS

| 3,470,471 | 9/1969 | Moore | 324/142 |
| 3,510,772 | 5/1970 | Luthi | 324/142 |

*Primary Examiner*—Alfred E. Smith
*Attorney*—Hugh A. Chapin

[57] ABSTRACT

An electronic counter for measuring the electrical power in two energy flow directions (delivered and returned) is disclosed. The circuit comprises an integrator for the product of current and voltage, and a first pair of threshold circuits having a predetermined positive voltage threshold circuit and a predetermined negative voltage threshold circuit connected at their outputs to a bistable flip flop circuit. A second pair of threshold circuits, whose two predetermined threshold levels are higher than the threshold levels of the first pair of threshold circuits, is connected in parallel with the first pair of threshold circuits. An additional flip flop circuit is connected after this second threshold circuit. The outputs of the two flip flop circuits are connected via an exclusive OR circuit to the input of the integrator to change the polarity of the input signal in response to changes in direction of the power flow. Two counters are connected through a gate circuit to the outputs of the flip flop circuits to count signals proportional to the power and to feed the signal to one counter for energy flow in one direction and to the second counter for energy flow in the opposite direction.

3 Claims, 7 Drawing Figures

SWITCHING CIRCUIT FOR MEASURING THE ELECTRICAL POWER IN TWO ENERGY FLOW DIRECTIONS (DELIVERED AND RETURNED)

BACKGROUND OF THE INVENTION

1. Field of the Invention

This invention relates to a circuit for measuring the electrical power in two energy flow directions (Delivered and Returned), comprising an electronic kWh meter which converts the output of a multiplier, which is the product of current and voltage, into a pulse sequence of the same valence. This is accomplished by means of an integrator and two threshold stages connected behind the integrator, as well as a bistable flip flop stage which upon attaining a time integral corresponding to the pulse value, reverses the polarity of the integrator input quantity.

2. Description of the Prior Art

At large transfer points between various electric power-supply stations the direction of the electrical power flow may change. It is necessary, therefore, to measure and indicate the power separately according to whether the flow of the power is in the direction of power "delivered" or power "returned." the kWh meters previously used at these locations measured the energy quantities with the desired accuracy in only one direction. As a result, one is forced to employ two such precision instruments.

An electrical meter is presently known which can be utilized to measure power flow in both directions. In order to cancel the error in the meter in the opposite direction of rotation to that being measured, a device is provided that depends on the sense of rotation of the meter armature and switches on a compensation means to compensate the error occurring during the return movement of the armature. The additional compensation devices which are necessary for this purpose entail not only greater expenditure and greater space requirements, but are also difficult to adjust.

Another counter for dual power flow directions is also shown in German Pat. No. 1,516,966 wherein a device, which depending on the direction of the power or energy flow, produces a switch in the meter voltage, or current, path, reverses the voltage or current pulses of the meter when the direction of the energy flow is reversed and changes to a two-rate meter mechanism. Because this device depends on the energy flow direction or the rotational direction discriminator, each time the sense of rotation of the counter is reversed, following a change in the direction of energy, that is, when the counter wants to run backward, the voltage or current path will be switched so that the counter will move forward, in each energy direction.

SUMMARY OF THE INVENTION

It is an object of the invention to provide a switching circuit for measuring power in two energy flow directions, comprising an electronic kWh meter previously described in detail. According to the invention, the switching circuit features two threshold stages connected to the output of the integrator and two flip flop stages connected to the output of each threshold stage with the output signals of both flip flop stages connected, on one hand, to the inputs of an exclusive OR circuit whose output signals produce polarity reversal at the input to the integrator, and, on the other hand, the output signals of both flip flop stages are connected, by gate circuits, to one meter mechanism, one connection for "Return" and one for "Delivery." In this manner, the coordination between the output signal of the bistable flip flop stages and the polarity at the input of the integrator is inter-changed so that the same meter can measure the delivered as well as the returned energy, with the desired accuracy.

BRIEF DESCRIPTION OF THE DRAWINGS

The invention is shown in the following detailed description with reference to the drawings, showing a schematic illustration of an exemplary embodiment in which.

DESCRIPTION OF THE PREFERRED EMBODIMENT

Figure 1:
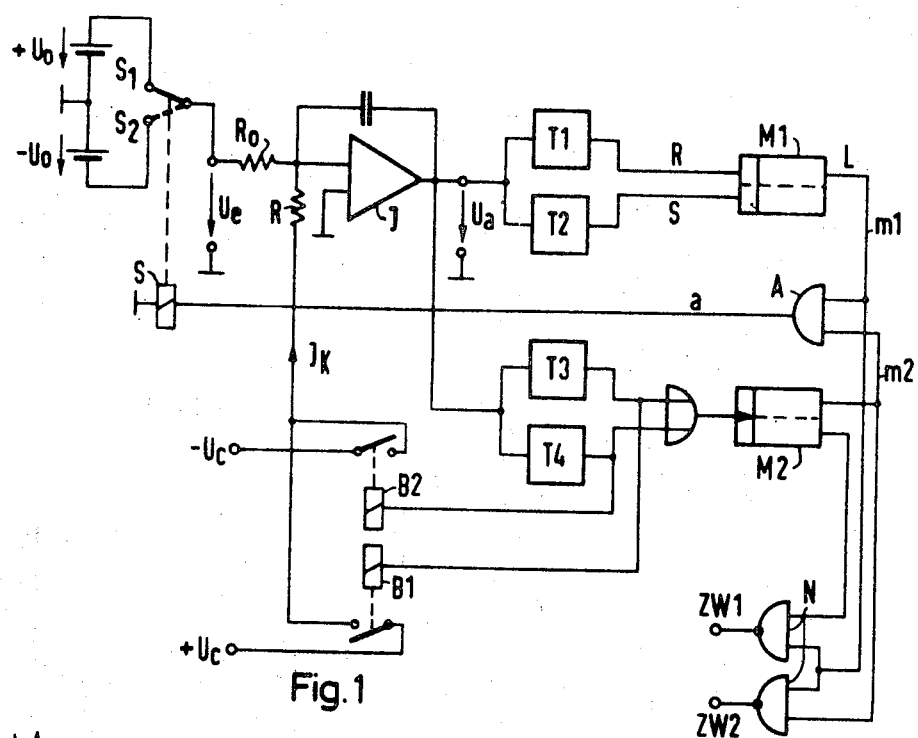
FIG. 1 is a basic circuit diagram of an electronic kWh meter for both energy flow directions.
Figure 2:
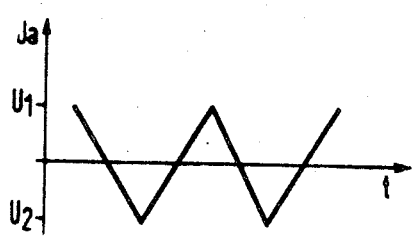
FIG. 2 is the time curve of the output voltage of the integrator during energy flow in one direction.

In FIG. 1 the actual multiplier is not shown but is represented symbolically by two voltage sources $+U_o$ and $-U_o$ which deliver voltages $+U_o$ and $-U_o$. Normally, voltage $U_o$ is proportional to the measurement of the effective power delivered by power-measuring transducers. Through contacts $S_1$ and $S_2$ of relay S, voltages $+U_o$ and $-U_o$ are connected by a resistor $R_o$ to an integrator J at the output of which a voltage $U_a$ appears. This voltage $U_a$ is applied to the threshold-trigger stages T1 and T2 which are connected with a bistable flip flop stage M1, the output of which is connected through relay S, to the input of the integrator J. Thus, the voltage $U_o$ alternates positively and negatively, depending on the polarity and value of voltage $U_a$ appearing at the output of the integrator J. Voltage $U_a$ has a curve as shown in FIG. 2. If, for example, $-U_o$ is connected to the input of the integrator J and if voltage $U_a$ reaches the value $U_1$, threshold stage T1 responds and causes flip flop stage M1 to assume the opposite state. A switch connects the relay S to the voltage output of flip flop M1 so that voltage $+U_o$ is now connected to the input of the integrator J as illustrated in FIG. 1. This condition remains until the curve of voltage $U_a$ reaches value $U_2$. At this point the threshold stage T2 responds and returns the flip flop stage M1 to its original position. Relay S thereby changes and the integrator J again receives voltage value $-U_o$ through contact $S_2$. Also connected to the output of the bistable flip flop stage M1, is a counter mechanism ZW1 which counts one unit when the bistable flip flop stage M1 flips from position "D" (i.e., power "delivered") into position "R" (i.e., power "returned"). The bistable flip flop stage M1 is a so-called R-S flip flop; it alters its initial state, therefore, only if it receives an input from the second input after having been set by the first input. Input R of the bistable flip flop stage M1 is provided with threshold stage T1 and input S is provided with threshold stage T2. Threshold stage T1 responds at voltage $U_1$ and threshold stage T2 responds at voltage $U_2$. Hence, a repeated pulse transmission by threshold stages T1 or T2 does not change the state of the bistable flip flop stage M1 unless the other stage has responded in the interim.

FIG. 2 shows the curve of the output voltage of the integrator when the flow of energy proceeds in one direction.

Figure 3:
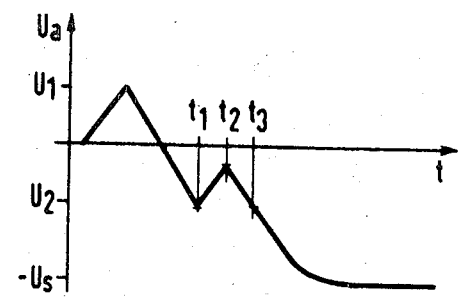
FIG. 3 is the time curve of the output voltage of the integrator during a change of direction in the energy flow, without the additional device of the invention.

FIG. 3 shows the behavior of the described circuit if the energy flow direction has changed at time point $t_2$. At the time $t_1$, threshold stage T2 has responded and the bistable flip flop stage M1 has assumed a condition such that $\Delta U_a/\Delta t > 0$. At the time $t_2$, the polarity of $U_o$ might now change so that $\Delta U_a/\Delta t < 0$. At the time $t_3$, the threshold stage T2 again responds. However, as required, the bistable flip flop stage M1 does not change its switching position, so that relay S is not activated. Voltage $U_a$ continues to rise above the value $U_2$ up to saturation voltage $-U_s$ of the integrator J. At this point, the entire switching arrangement is blocked. This state occurs when the voltage $U_o$—which is designed to be proportional to the effective power, to be measured—changes its polarity, through power reversal at the measuring point, e.g., a transfer point. This blockage of the switching circuit is desired if the energy flow is only to be measured in one direction. It prevents the kWh meter from running under idle conditions.

The present invention is based on the concept of determining an approaching blockage in time, and to perform the switching operation in such a way that the blockage will be arrested and, if the condition which originally led to the blockage continues, the counting pulses which correspond to the quantity of energy to be measured, will be delivered to a second counting mechanism ZW2. Thus, the changes in the position of the bistable flip flop stage M1, from "D" to "R" are determined and utilized as counting pulses.

Figure 4:
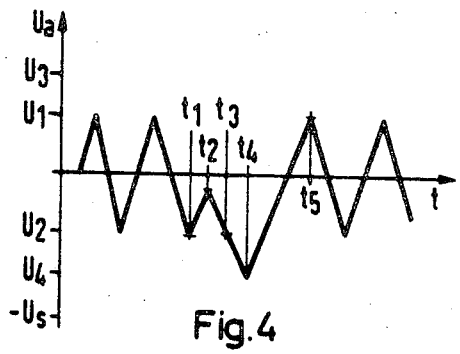
FIG. 4 is the time curve of the output voltage of the integrator during a change in direction of the energy flow, when the circuit according to this invention is present.

To this end two more threshold stages T3 and T4 and another flip flop stage M2 are provided. Furthermore, an exclusive OR circuit A is employed. The mode of operation is illustrated in FIGS. 1 and 4. In FIG. 4, the following relations apply: $U_3 > U_1$ and $U_4 < U_2$.

The following determinations apply when $U_o > 0$: The "D" signal at the output of the flip flop stage M1 connects $+U_o$, through switch contact $S_1$, to the input of the integrator J. An "R" signal at the output of the flip flop stage M1 connects the voltage $-U_o$, through switch contact $S_2$, to the input of integrator J. The OR circuit A has the transmission function: $a = m1$; when $m2 =$ "R"; $a = \overline{m}1$; when $m2 =$ "D."

In FIG. 4, the threshold stage T2 has responded at the time $t_1$. This makes $m1 =$ "R" and accordingly $\Delta U_a / \Delta t > 0$, due to the signal inversion through the integrator J. At time point $t_2$, voltage $U_o < 0$, because of a reversal in the direction of the energy flow. Because nothing changes in the condition of relay S, $\Delta U_a / \Delta t < 0$. At the time $t_3$, the threshold stage T2 responds again; but the output signal from flip flop stage M1 does not change. When the voltage $U_a$ however reaches the value $U_4$, threshold stage T4 responds setting flip flop stage M2 to the "D" condition. Because $a = \overline{m}1$, when stage M2 is in the "D" condition, the coordination between the flip flop stage M1 and the relay S interchanges, which means that the circuit to contact $S_2$ is opened and the circuit to switch contact $S_1$ is closed. Since it is a prerequisite that $U_o < 0$, and $+U_o < 0$, $\Delta U_a / \Delta t$ now becomes $\Delta U_a / \Delta t > 0$.

As soon as threshold stage T4 has responded ($m2 =$ "D"), the counting pulses transmitted from flip flop stage M1 are guided through gate circuit N, to counting mechanism ZW2. Thus, while counting mechanism ZW1 registers, for example, the return energy, counting mechanism ZW2 registers the delivered energy.

Figure 5:
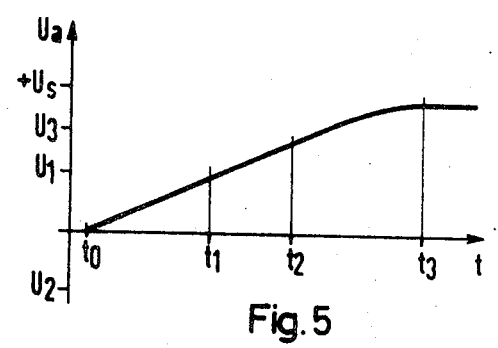
FIG. 5 is the time curve of the output voltage of the integrator without energy flow in the presence of zero errors and drifts.

As seen in FIG. 1, the switching arrangement of the present invention comprises two more circuit members B1 and B2, which are illustrated in form of relays and are excited by the outputs of the threshold stages T3 and T4. With the aid of these circuit members B1 and B2, a positive or a negative compensation voltage $+U_c$ or $-U_c$, can be applied to the input of the integrator, through a resistance $R$, and may produce a corresponding compensation current $J_k$. The mode of operation is described in greater detail in FIGS. 5 and 6.

Error voltages and currents occur in all real integrators. They lead to changes in the output voltage $U_a$ of the integrator J even when the input voltage $U_e$ at the input of the integrator equals zero. Since the magnitude of integrator error with respect to its direction and magnitude does not depend on the position of switch S the following applies according to FIG. 5: At time $t_0$ it should be $m2 =$ "R" and the voltage $U_e = 0$. Due, however, to the magnitude of the error, the output voltage $U_a$ of the integrator J changes slowly. At time $t_1$, the threshold voltage of the threshold stage T1 is reached. Therefore, nothing changes in the curve of the voltage. At time $t_2$, threshold stage T3 responds and switches the counter mechanism ZW2 to the other energy direction, through a flip flop stage M2 and the exclusive OR circuit A. Voltage $U_a$ continues to rise until the saturation voltage $+U_s$ of the integrator J is attained.

Assuming that at the time $t_0$, the switch position was on return, a switch-over would be effected to delivery at the time $t_2$. Now, if at time $t_3$, the voltage $U_o$ deviates from zero, namely, to a polarity corresponding to the energy in the return direction, the output voltage $U_a$ will not change, because—due to the error magnitude of the integrator—the "Delivery" switching position prevails, which means, however, that the kWh meter is blocked. This state is prevented by switches B1 and B2 which are actuated by threshold stages T3 and T4. As soon as either the threshold stage T3 or the threshold stage T4 responds, a compensation current $J_k$ is connected to the integrator input, with such polarity that the output voltage $U_a$ returns to $U_a = 0$. The absolute level of the current is selected such that $J_k$ is higher than $U_{omax}/R_o$. The mode of operation will be explained in FIG. 6.

Figure 6:
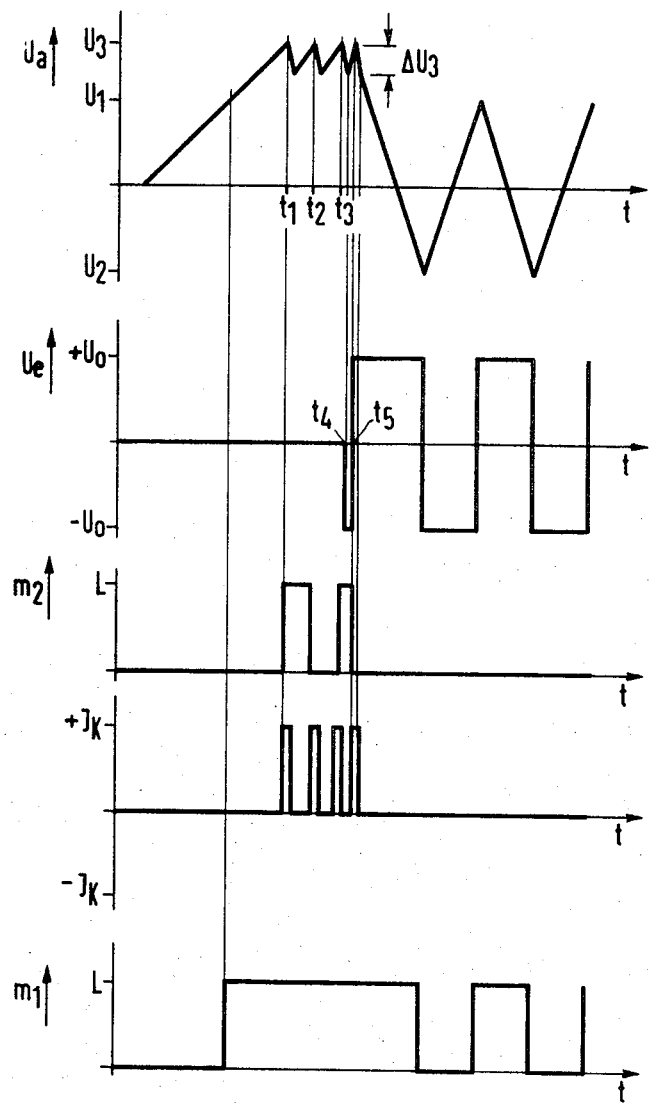
FIG. 6 is the time curve of the output voltage of the integrator, as well as of the voltage and the signals at the various stages, during error compensation, employing the circuit constructed according to the invention.

In FIG. 6 the first diagram shows the curve of the output voltage of the integrator $U_a$, the second diagram shows the time curve of the input voltage $U_e$ to the integrator, the third diagram shows the switching position of the flip flop stage M2, the fourth diagram shows the dependency of the compensation current and the last diagram shows the switching position of the flip flop stage M1.

At the time $t_1$, the threshold stage T3 responds. As a result, the output $m2$ conducts a "$D$" signal which corresponds to "Delivery." At the same time, a compensation current $+J_k$ is connected, through switching stage B1, to the input of the integrator J until the output voltage $U_a$ of the integrator decreases by the amount $\Delta U_3$, which is the hysteresis voltage of the threshold stage T3. Thereafter, the compensation current is switched off and the output voltage $U_a$ of the integrator rises again, until voltage $U_3$ is reached. The threshold stage T3 responds and sets the flip flop stage M2, so that output $m_2$ conducts an "$R$" signal, meaning it is switched to "Return." This is continued many times.

At time $t_4$, the output $m_2$ of flip flop stage M2 is set to "$D$" signal which is established as meaning "Delivery." At the same time, the return of energy may occur so that the input voltage $U_e$ of the integrator J assumes the incoming polarity. Due to the signal inversion by the integrator J, the output voltage $U_a$ now rises quickly up to voltage $U_3$, which switches, by threshold stage T3, the output $m_2$ of the flip flop stage M2, to "$R$," which means that at the time $t_5$, the device is again switched to "Return." From this moment on, the counting pulses which correspond to the quantity of energy are guided to the correct counting mechanism ZW1 "Return."

Figure 7:
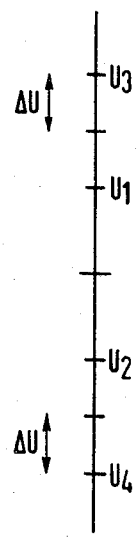
FIG. 7 is an illustration of various threshold voltages to which the threshold switches respond.

Thus, in the switching arrangement of the present invention component ranges are formed with threshold voltages $U_1$ to $U_4$ with the aid of threshold stages T1 to T4, for the range of the output voltage $U_a$ of the integrator J, as illustrated in FIG. 7. In place of relays S, B1 and B2, contact-free circuit members preferably are used.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A switching circuit for measuring electrical power in two energy flow directions comprising
   an integrator means to obtain the integral of the product of the current and voltage formed by a multiplier,
   a first pair of threshold circuits connected to the output of the integrator means, one of the threshold circuits having a predetermined positive voltage threshold and the other threshold circuit having a predetermined negative voltage threshold,
   a bistable flip flop circuit connected to the output of the threshold circuits,
   a second pair of threshold circuits connected to the output of the integrator means, one of the threshold circuits having a predetermined positive voltage threshold greater than the positive voltage threshold of the first positive threshold circuit, the other of the threshold circuits having a predetermined negative voltage threshold greater than the negative threshold voltage of the first negative threshold circuit,
   a second flip flop circuit connected to the output of the threshold circuits,
   an exclusive OR circuit connected to the output of both of the flip flop circuits, the output of the OR circuit being connected to the input of the integrator means to reverse the polarity of the input signal to the integrator when the direction of the energy flow changes,
   a gate circuit connected to the output of the flip flop circuits, and
   a first and a second counter connected to the output of the gate circuit, the first counter receiving an input from the gate circuit for power flow in one direction, and the second counter receiving the signal for power energy flow in the opposite direction.

2. A switching circuit for measuring electrical power in two energy flow directions as set forth in claim 1 further comprising a compensation circuit connected to the output of the second pair of threshold circuits for feeding a compensation current to the input of the integrator means to overcome the error signals of the integrator.

3. A switching circuit for measuring electrical power in two energy flow directions as set forth in claim 2 wherein the maximum compensation current is substantially equal to the maximum input voltage divided by the input resistance of the integrator means.

* * * * *